UNITED STATES PATENT OFFICE.

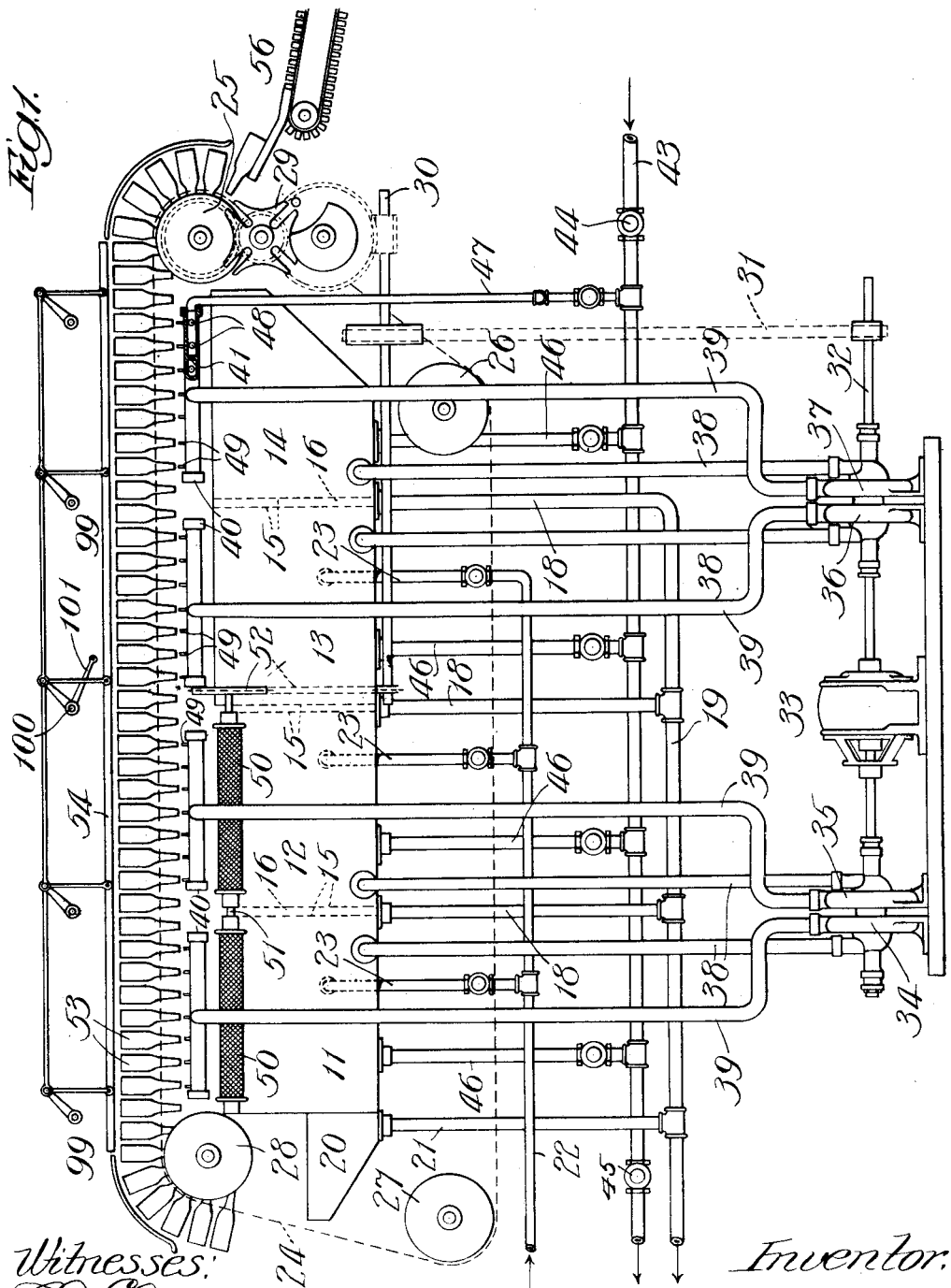

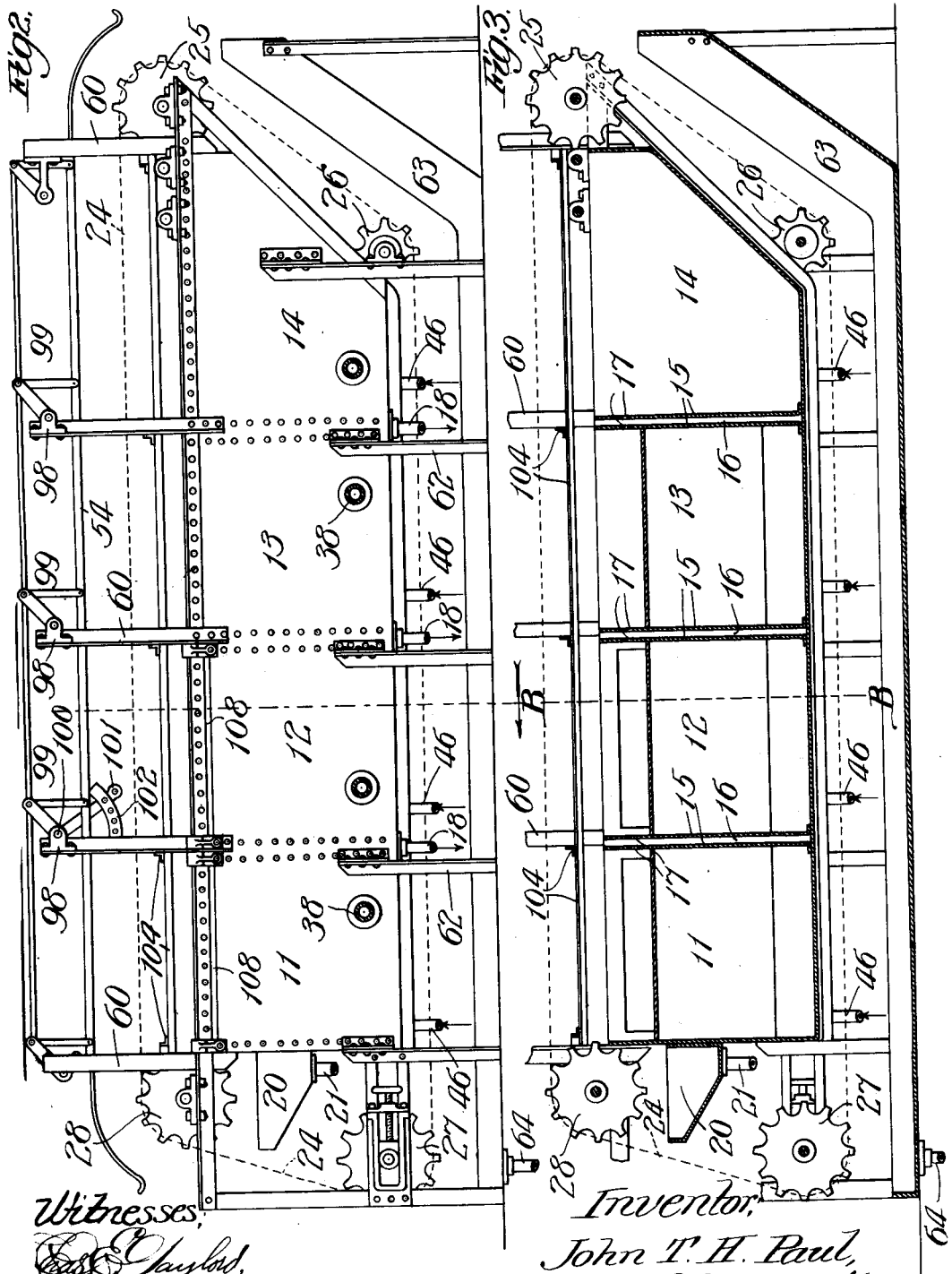

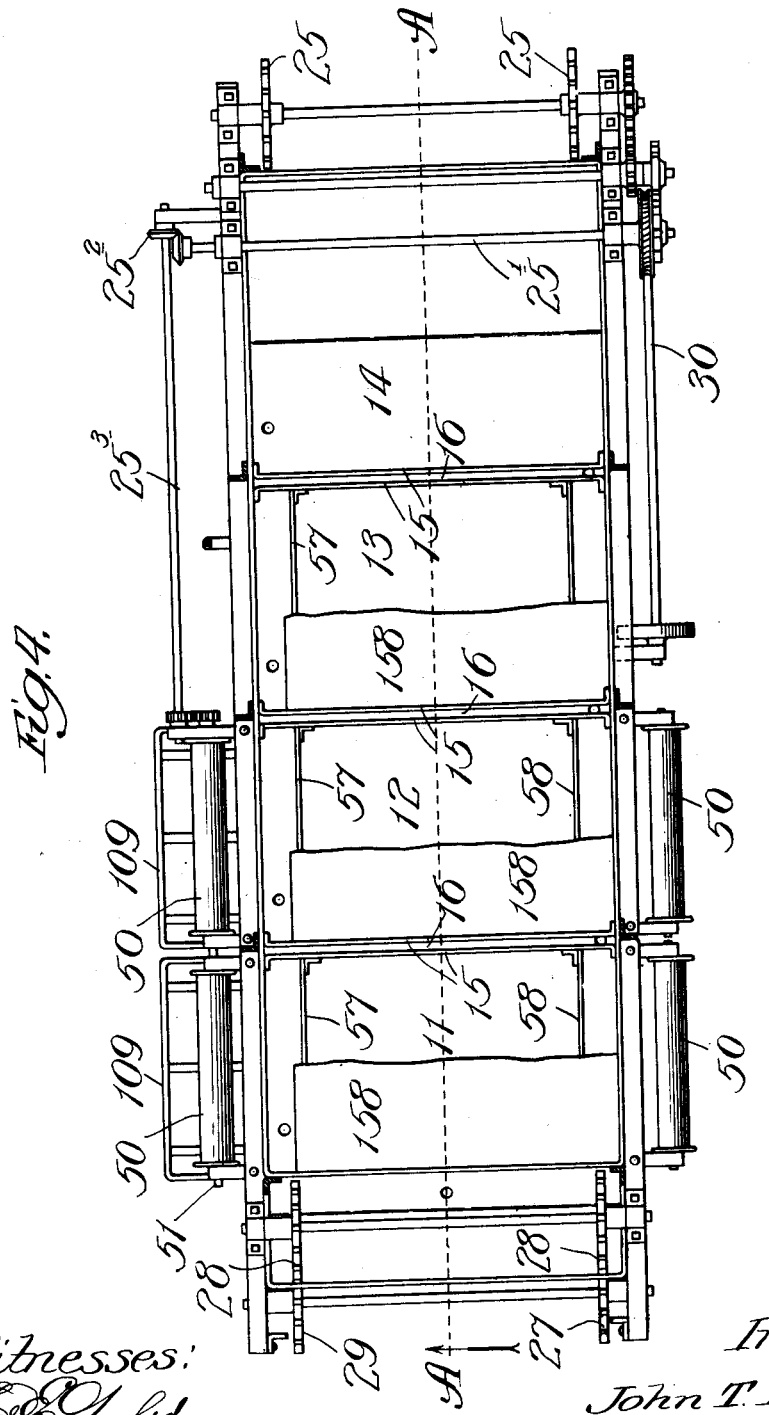

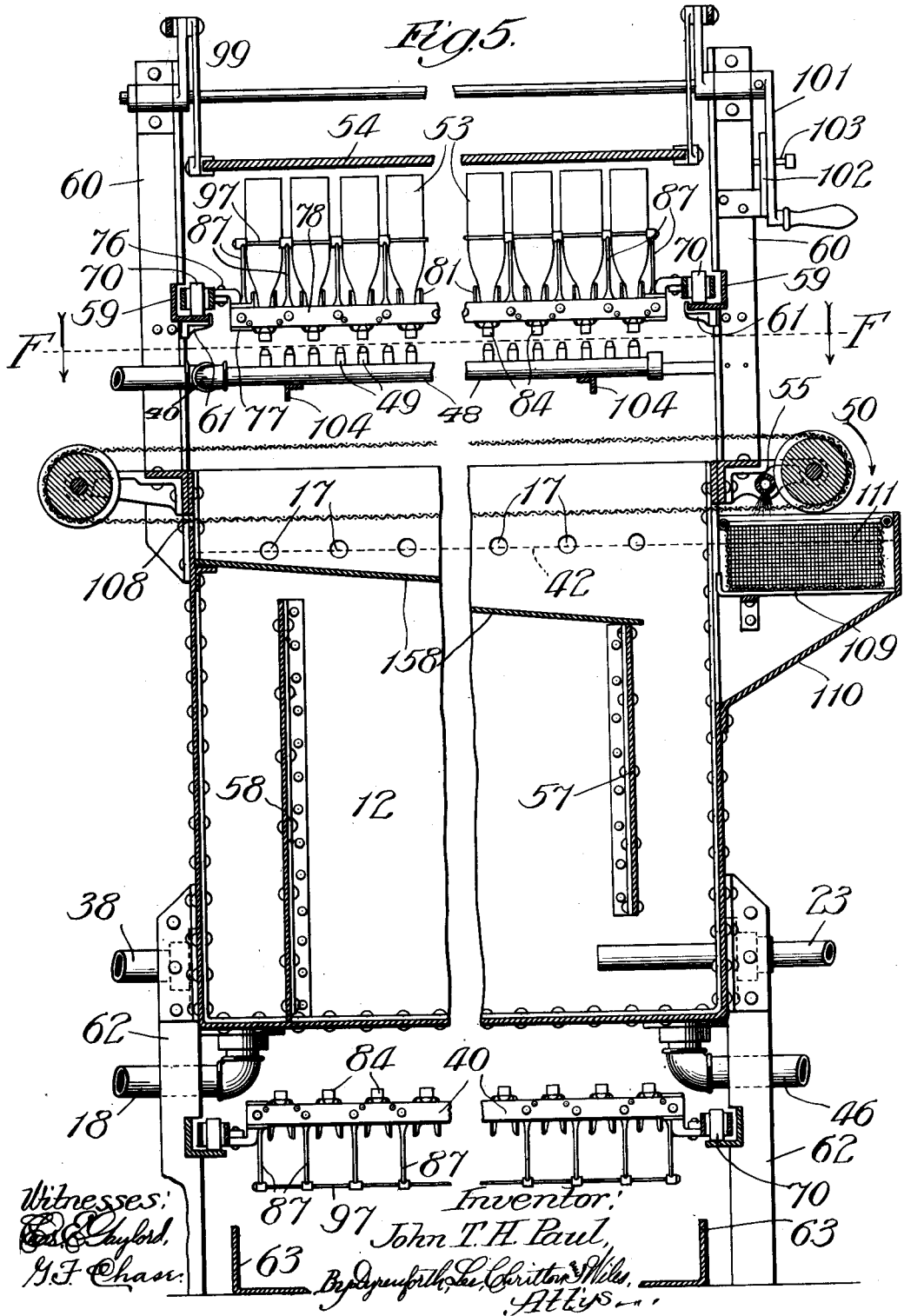

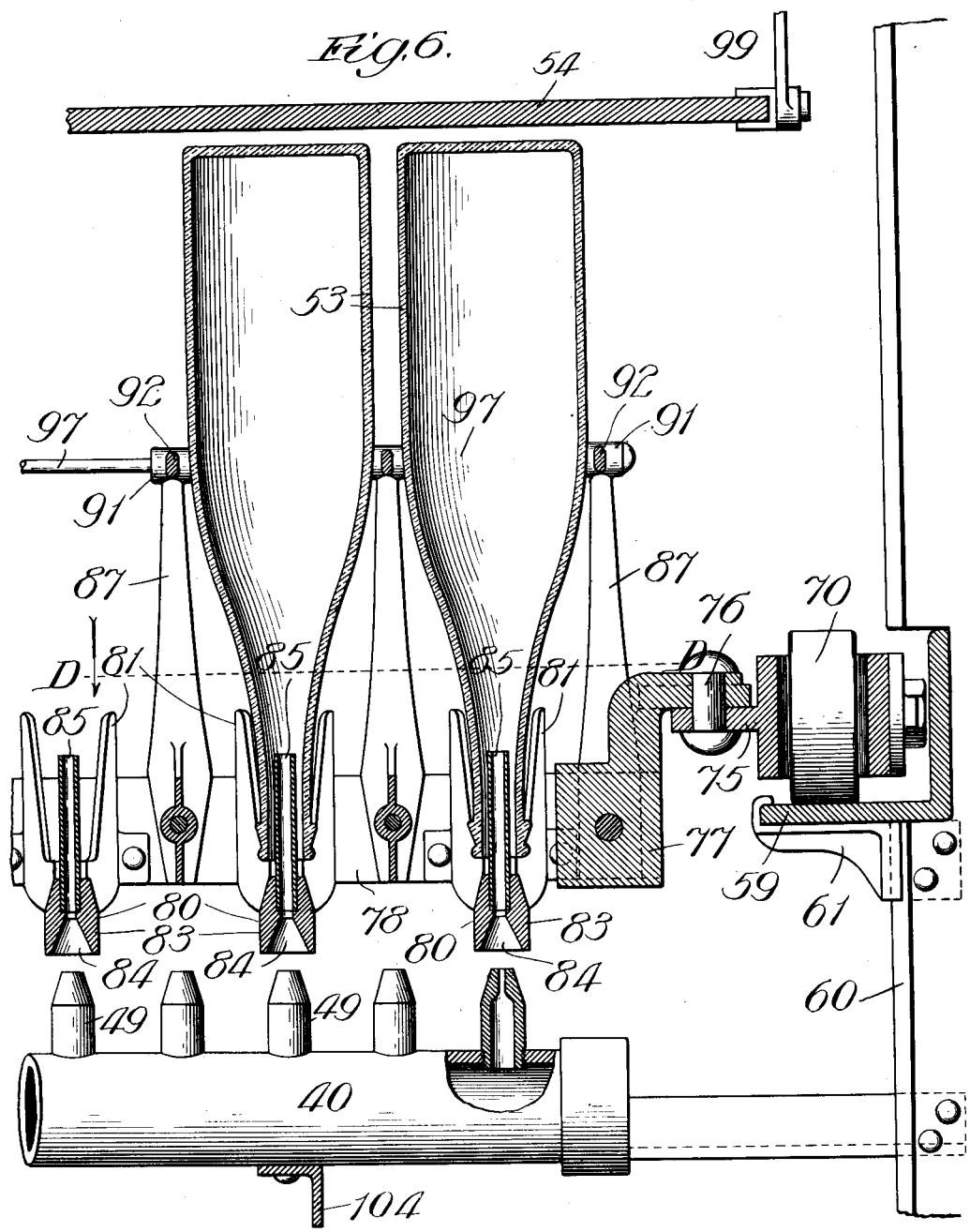

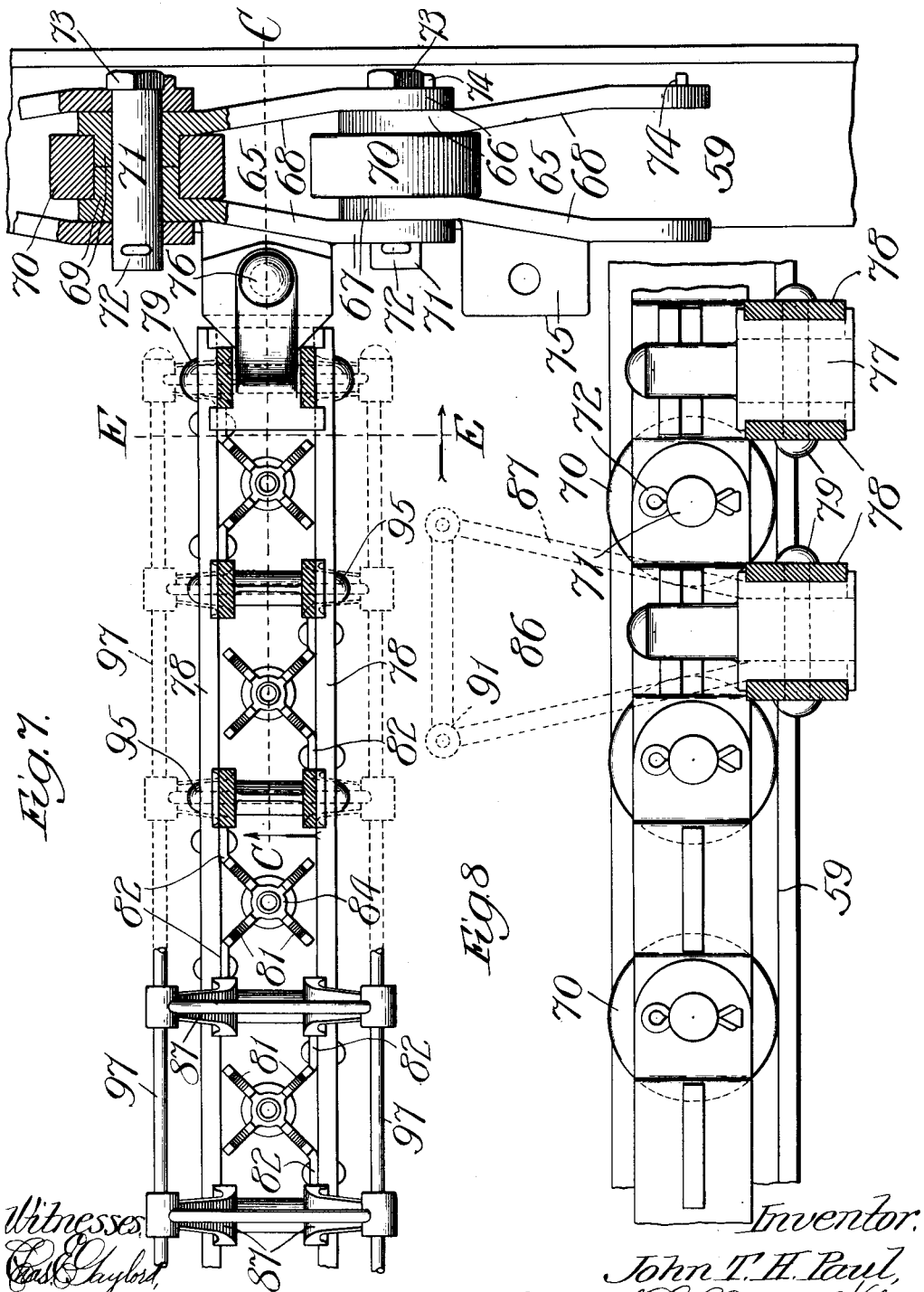

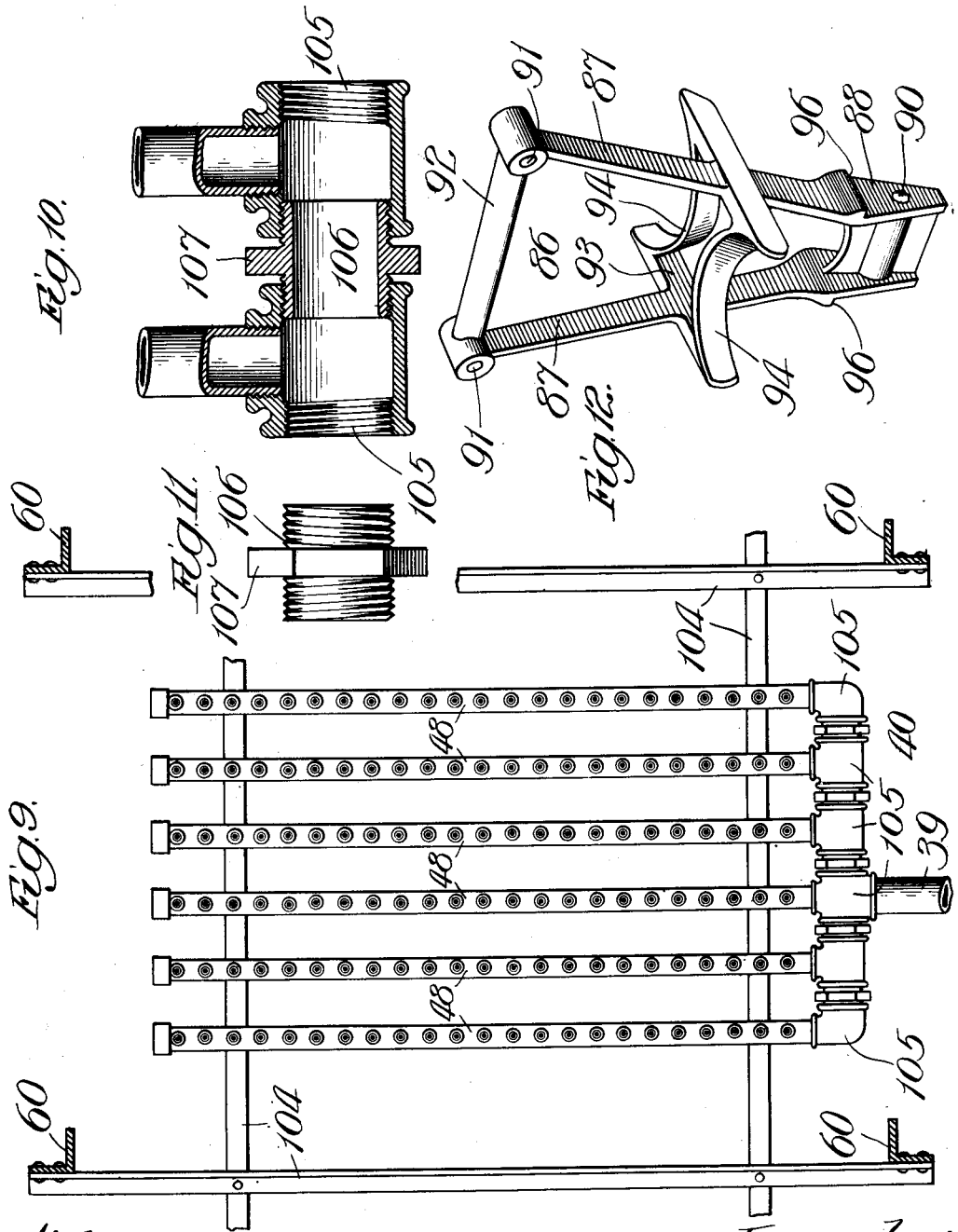

JOHN T. H. PAUL, OF CHICAGO, ILLINOIS, ASSIGNOR TO E. GOLDMAN & CO., INC., OF CHICAGO, ILLINOIS, A CORPORATION OF ILLINOIS.

BOTTLE-WASHING MACHINE.

1,130,015.          Specification of Letters Patent.          Patented Mar. 2, 1915.

Application filed August 29, 1910. Serial No. 579,470.

*To all whom it may concern:*

Be it known that I, JOHN T. H. PAUL, a citizen of the United States, residing at Chicago, in the county of Cook and State of Illinois, have invented a new and useful Improvement in Bottle-Washing Machines, of which the following is a specification.

My invention relates to an improved machine for cleansing bottles, and the like, which I have more especially devised for the practice of a method of cleansing the same to clean and sterilize them and remove their labels, involving subjection of the bottles, in inverted position, to the action of jets of water and which method forms the subject of the application for Letters Patent of S. L. Goldman, Serial No. 566,936, filed June 15, 1910.

Referring to the accompanying drawings—Figure 1 is a view of the apparatus in side elevation; Fig. 2 is a view of a portion of the apparatus in side elevation with the bottle conveyer indicated by dotted representation, but with the apparatus otherwise stripped of most of the mechanism, said view illustrating a modified form of drive for the label conveyer; Fig. 3 is a central longitudinal section of the apparatus as shown in Fig. 2, taken on the line A—A, Fig. 4; Fig. 4 is a broken plan view of the same; Fig. 5 is a broken section taken on line B—B, Fig. 3; Fig. 6 is an enlarged view of a portion of the upper part of the showing in Fig. 5, and is a section on line C—C, Fig. 7; Fig. 7 is a section on line D—D, Fig. 6; Fig. 8 is a section on line E—E, Fig. 7; Fig. 9 is an enlarged plan-section on line F—F, Fig. 5, illustrating the manner of supporting the spraying-pipes; Fig. 10 is a broken enlarged sectional view illustrating the manner of adjustably coupling together the spraying-pipes; Fig. 11 is a view in elevation of the form of union employed with the couplings, and Fig. 12 is a perspective view of a casting affording a pocket-forming member for the bottle-pockets on the conveyer.

A primary object of the present invention is to provide a novel construction of apparatus for cleansing bottles by subjecting them both internally and externally to the action of cleansing water emitted from nozzles, whereby the bottles, after being placed in the machine in inverted position, shall be carried through the same and automatically discharged therefrom upon being cleansed, and be caused to move intermittently while undergoing the cleansing operation to maintain them, in sets, for adequately prolonged periods, under subjection to varying conditions of the water emitted from different sets of nozzles.

The general plan of the apparatus may be best explained by reference, more particularly, to Fig. 1: A tank for containing the supply of cleansing water is provided in the form of a series of compartments, of which four are represented and denoted by the reference characters 11, 12, 13 and 14, the compartments being preferably produced, as clearly shown in Fig. 3, by partitions 15 forming overflow-chambers 16 between them communicating through openings 17 in their upper portions with the compartments they separate. Each chamber 16 discharges through a depending pipe 18 to a pipe 19, which may lead to a sewer. The water in the compartments 11, 12 and 13 may contain a suitable washing-compound in solution, but that in the end-compartment 14 should be pure cool water for rinsing purposes; and the compartment 11 is shown to be preceded by a hopper 20 to receive from bottles, as they are placed in the machine, dripipngs which flow through a depending pipe 21 into the pipe 19. The water in the compartment 11 should be maintained in warm condition, or insufficiently hot to fracture the cold bottles subjected to it as hereinafter described, while that in the compartment 12 should be maintained in very hot condition, the water being preferably only warm in the compartment 13; and steam is introduced, for the water-heating purpose, into the compartments near their bottoms from a pipe 22 by way of valve-controlled branches 23. These branches lead into the tank from the side opposite that presented in Fig. 1, as shown in Fig. 5. A track extends lengthwise over the tank for the travel thereon of an endless carrier 24 passing about sprockets 25, 26, 27 and 28 actuated by the well-known Geneva movement, represented as a whole at 29 and as geared to the shaft which carries the sprocket 25; and the worm-shaft 30 of the movement has a belt connection 31 with the shaft 32 of an electric motor 33. The motor-shaft is common to four centrifugal pumps of ordinary general construction, though the pump 34 is arranged to deliver water at comparatively weak pressure, while the pump 35 is adapted to discharge at much stronger pressure and the pumps 36 and 37 discharge preferably at a still greater pressure. Each pump takes its supply of water from the bottom-portion of a tank-compartment through a pipe 38 and delivers it through an upright pipe 39, each of the last-named pipes terminating above the top of the tank in a manifold 40, that adjacent to the compartment 14 containing a partition 41 for a purpose hereinafter explained. The tank-compartments are supplied with water, (the level of which is indicated at 42 in Fig. 5) from a suitable source (not shown) through a pipe 43 containing shut-off valves 44 and 45 toward its opposite ends and having similar valved branch-pipes 46 extending from it, each into the bottom of a tank-compartment; and when it is desired to empty the compartments this may be done by closing the valve 44 and opening the valve 45, (which is closed during the operation of the machine) to enable their contents to discharge by way of the filling branches through the pipe 43, which then serves as a drain-pipe. The section of the end-manifold 40 formed by the partition 41 is shown to have a valved pipe-connection 47 with the supply-pipe 43. As shown in Fig. 5, the filling and drain pipe 43 with its branches are on the same side of the tank as the steam-pipe 22.

Each manifold 40, which is parallel with the tank, has a series of parallel pipes 48 extending from it transversely of and beneath the path of movement of the bottle, the manifolds being preferably constructed as hereinafter described to render the pipes relatively adjustable; and nozzles 49 extend equidistant apart in series along each pipe and in number to introduce the water into the necks of bottles registering with them and at the same time against their outer surfaces. At 50, 50 are represented endless aprons, preferably of screen material, forming conveyers more definitely described hereinafter, supported to extend underneath each set of pipes 48 crossing the tank-compartments 11 and 12 to catch and carry off the labels and dirt washed from the bottles, the two alining rollers at one end of the screen-aprons being on a common shaft 51 having a sprocket and chain connection, indicated at 52, with the worm-shaft 30, as shown in Fig. 1. The preferred construction, however, is that represented in Fig. 4, with the centers of the parts of the movement 25 in horizontal alinement and the shaft 25' of the worm-wheel extending to the opposite side of the track, where it has a miter-gear engagement at $25^2$ with a shaft $25^3$ geared to the shaft 51.

Bottles 53 to be cleansed by the machine, with the motor 33 in action to drive the carrier 24 intermittently and the aprons 50 continuously and actuate the pumps to take the water through the pipes 38 out of the previously filled tank-compartments and force it under the relative pressures, hereinbefore referred to, by way of the pipes 39 and manifolds 40 through the pipes 48 to discharge at their nozzles 49, are introduced at the end of the machine equipped with the hopper 20, upon the carrier 24, which is constructed as hereinafter described to support the bottles in inverted position and in spaced relation to adapt them to register with nozzles 49. The bottles are supported on their carrier in transverse rows of frame-like pockets, and the operation is so timed that as the first twelve rows of bottles register with the first tank-compartment 11, the jets of warm water from that compartment registering with those bottles discharge into them through their necks, while jets alternating with those jets play against the outer surfaces of the bottles to loosen and wash off the labels; and the water sprayed by these alternate jets strikes a hood 54 adjustably supported, as hereinafter described, to extend lengthwise over the tank to deflect the water back into the tank and wash the bottoms of the bottles. The pressure of the warm water is so light as to avoid disintegrating the labels to permit them to be soaked off and dislodged in whole, or substantially whole, condition to drop upon a conveyer 50 and be carried off; and this initial washing serves to remove heavier dirt that may be on the outer surfaces of the bottles and to preliminarily soften sediment within them. The next movement of the carrier 24 brings the bottles first acted on over the tank-section 12, where they are similarly subjected to the action of jets of very hot water under strong pressure from the pump 35, with the effects of removing from the bottles any label-remnants, which are carried off by the respective conveyer 50, and further cleaning the bottles externally and internally, besides sterilizing them. Any material tending to adhere to the screen-apron of a conveyer 50 is forcibly dislodged therefrom by the action of the water sprayed from a perforated pipe 55 (Fig. 5) acting against that screen. The next movement of the carrier 24 brings the same bottles over the compartment 13, where they are similarly subjected to the action of the jets of warm water under strong pressure from the pump 36, with the effects of finishing the cleansing of the outer surfaces of the bottles, dislodging any still adhering sediment from their interiors and cleansing the latter. The next movement of the carrier brings the same rows of bottles over the compartment 14 where they are subjected in the manner described to the jets of cool water under strong pressure from the pump 37 to thoroughly rinse them externally and internally; and as the bottles register with the jets 49, which receive their supply of fresh water from the end-section of the last manifold 40, they are washed by that water to remove any of the solution upon them from the compartment 14, which becomes contaminated with the solution from the compartment 13 that is washed off the bottles into the compartment 14. This more or less weak solution is removed by the final rinsing with pure cool water from the pipe 47, and since this pure water, after performing its rinsing function, is added to the tank-section 14 only slightly affected by the chemical, it tends to counteract or minimize the contamination referred to of the contents of the latter. As will be understood, the overflow from the compartment 14 removes contaminated water therefrom, thus augmenting the purifying effect of the rinsing water on its contents; and the overflows from the other compartments take care of the rise of water in them under the accumulation therein of matter washed off the bottles. In the next movement of the carrier to advance the set of bottle-rows beyond the compartment 14, the cleansed and sterilized bottles drop upon a conveyer, indicated at 56 and involving any known or suitable construction, to be carried off. Of course, while the progressive operations are being performed on the first set of bottle-rows, the endless carrier 24 is being charged with additional sets of bottles requiring to be cleaned, and these are intermittently moved through the machine for subjection to its described successive actions, thereby rendering the operation of the apparatus continuous and wholly automatic.

For the purpose of preventing the foreign matter from the bottles which enters the compartments with the wash-water from being sucked out by the pumps through the pipes 38, each compartment contains a baffle-plate 57 extending between its end-walls near one side-wall and supported above its base, as most clearly shown in Fig. 5, and a second baffle-plate 58 preferably rising to a greater height than the first from the base of the compartment and extending between its end-walls adjacent to the opposite side-wall from which the suction-pipe 38 leads. From the last-named side-wall just below the overflow-openings, a shed 158, which extends from end to end of the compartment, inclines to the upper edge of the shorter plate 57, and serves to direct the washings from the bottles to enter the compartment through the space behind that baffle-plate, whence the water must rise and overflow the baffle-plate 58 to reach the outlet leading to the suction-pipe, thus leaving the foreign matter trapped in the compartment.

The track 59 (Fig. 5) for the carrier 24 consists of angle-bars let into the inner faces of posts 60 rising at uniform intervals from opposite sides of the tank, the angle-bar rails being supported on brackets 61 extending from the posts; and the tank itself is shown to be supported on legs 62 to afford a space underneath it for the admission of a pan 63 to receive water that may drop into it from the carrier 24 and other parts of the apparatus, and convey it off through a waste-pipe 64 at one end of the pan. The legs support a track like that on the posts 60 for the travel of the under part of the endless carrier (Fig. 5).

The preferred construction of the carrier 24 is that most clearly illustrated in Figs. 6 to 8, inclusive, and described as follows: The sprockets for the carrier are provided in pairs, forming a set at each side of the machine for supporting an endless chain. This chain comprises a succession of similar links 65 each consisting of a pair of link-members 66 and 67 formed with rearwardly diverging or spreading central sections 68 and having similar annular bosses 69 projecting from the inner faces of their forward ends to meet and space those ends and form the bearing for a roller 70. The narrower end of the link is embraced by the wider end of the next-succeeding link and the two are flexibly fastened together by a pivot-pin 71 passing through openings in the wider end and those alining therewith through the bosses 69, the pin being retained by a cotter 72 in one end and having an angular head 73 on its opposite end to engage with a stop 74 projecting from the link-member 66. A perforated lug 75 extends laterally from the intermediate inclined section 68 of each link-member 67. Each lug 75 on the two conveyer-chains has fastened to it, as by a rivet 76, an angular bracket 77, and alining links of the two chains are connected together by parallel bars 78 let, at their ends, into the opposite sides of corresponding brackets 77 and fastened, as by a rivet 79 passed through the bracket and the bar-ends embracing it.

The bottles illustrated are of the narrow-neck variety, though the present apparatus is adaptable for operating on other varieties, such as milk-bottles and the like. To render the action thoroughly effective on the narrow-neck variety they must discharge the washing-water from their interiors freely, thereby to prevent the accumulation of water in them, which would tend to prevent introduction of the water discharged from the nozzles far enough into the bottles to reach their higher end-portions. To this end, the conveyer 24 is equipped with similar devices 80, each consisting of a casting formed with four similar legs 81 to receive a bottle-neck, with a flange 82 projecting outwardly from each of two of the legs, the latter converging to a nipple 83 having an outwardly flaring mouth 84; and a tube 85 extends from about midway of the length of the nipple to a distance beyond the same that will cause it to reach quite far into the bottle-neck. Such castings are secured through their flanges 82 alternately to the inner faces of the members of each pair of the bars 78 (Fig. 7) at equal distances apart and in number corresponding with that of rows of bottle-pockets also provided on the bars 78 to extend such rows transversely of the conveyer. These pockets are formed with members like the one shown in Fig. 12, and denoted by the reference-character 86. It comprises a pair of arms 87 diverging from a head 88 containing a longitudinal aperture 90, the arms terminating in eyes 91, at which they are connected by a crossbar 92; and about the arms, between their ends, is formed a frame 93 presenting opposite concave side-faces 94 inclining in the direction transversely of their length to perform a guiding function in seating the bottles into the pockets. One of these castings 86 is placed at each side of each device 80 between each pair of the chain-connecting bars 78 and is rigidly fastened in place by pins or rivets 95 passed through the bars and the aperture 90 of the head 88 interposed between them, which bears at shoulders 96 against the upper edges of the bars. Rods 97 passing through the eyes 91 connect the members 86 of each series thereof between a pair of bars 78, thereby causing each pair of the members with the rods connecting them to form a bottle-pocket with the tube 85 at the center thereof, whereby in placing a bottle in the required inverted condition into a pocket upon the conveyer, it is guided by the opposing faces 94 of adjacent frames 93 to centralize itself in the pocket and thus slip over the tube 85 therein. Thus, as bottles so seated register with nozzles 49, the jetting into them through their necks takes place by way of the mouths 84 and tubes 85, and the jets being placed some distance below the flaring ends of the mouths, they carry sufficient air with the water into the bottles to force the rapid and free discharge out of them and avoid the effect of air-binding.

Since the machine is designed for washing bottles and the like of all varieties and sizes, the hood 54, which is represented in Fig. 1 as occupying its lowest position to be adequately near the bottoms of the bottles 53 to prevent dislodgment or material displacement thereof under the force of the jets in passing through the apparatus, is rendered adjustable to adapt it to have such required proximity to the bottoms of any size of bottles acted upon. To that end the hood is supported on the angle-iron posts 60, at brackets 98 thereon, through the medium of pivotal links 99 (Figs. 2 and 5), these links at one pair of the posts, the members of which aline transversely of the tank, being fastened to their supporting brackets 98 by a rock-shaft 100 connecting them and carrying on one end a crank-handle 101 movable along an apertured segment 102 on the adjacent post to be fastened in any position by a pin 103 passed through the handle and an aperture in the segment registering therewith. Thus, by turning the handle in one direction or the other the link-sections immediately connected with the brackets 98 will be turned to effect raising or lowering of the hood, as the case may be; and the pin 103 will serve to fasten it releasably in the adjusted position.

Wear is liable to occur, particularly on the carrier, through friction between the conveyer-wheels 70 and their bearings 69, with the effect of disorganizing the required accuracy in registration of the bottles with the jets that play into them. To compensate for this wear, the jet-pipes 48 of each set thereof, which may be composed of six, as represented (Fig. 9), are supported and coupled together in a manner to render them relatively adjustable. To this end, a rectangular frame 104 for sustaining the jet-pipes extends over each tank-compartment, the frame being shown to be composed of angle-bars and supported on the posts 60. The manifold 40 is composed of a series of couplings 105 from which the jet-pipes extend, and unions 106, each having a central hexagonal head 107, for the application of a wrench, and right-and-left screw-threads at opposite sides of the head. These unions adjustably connect the couplings, so that turning any one of them will, depending on the direction of turning, spread the respective pipes 48 farther apart or bring them closer together to set or re-set them for the required registration referred to.

Each of the two compartments 11 and 12 equipped with an endless apron 50 for intercepting and carrying off labels and other matter washed from the bottles is provided in its side presented in Fig. 2, with a longitudinal slot 108 near its upper end; and on the opposite side is an extension 109 of the compartment opening thereto and having an inclined bottom 110. In this extension is loosely supported a wire-work basket 111 to receive the labels carried away and dumped into it by the screen-conveyer, one of the rollers of which turns just above the basket, while the opposite roller is supported above the slot. The basket intercepts the labels and permits the water to separate from them and flow into the compartment. The portion of the screen which is uppermost in its movement extends over the top of the compartment while the lower portion moves through the open side thereof to which the basket is adjacent and through the slot 108. The location of the spraying pipe 55 adapts it to dislodge matter adhering to the screen into the adjacent basket 111.

What I claim as new and desire to secure by Letters Patent is—

1. In a bottle-washing machine, the combination of a tank forming a series of compartments and having a track extending lengthwise over it, sets of relatively adjustable jet-pipes extending over the compartments below said track, means for supplying washing-water to said pipes, an endless carrier comprising sprocket-driven chains provided with rollers to ride on said track and spaced bars connecting them and forming supports for bottles in inverted position, means for driving the carrier intermittently, and a conveyer at the delivery-end of the carrier to receive the bottles discharging therefrom.

2. In a bottle-washing machine, the combination of a tank forming a series of compartments and having a track extending lengthwise over it, sets of jetting-nozzles extending over the compartments below said track, means for supplying washing-water to said nozzles, an endless carrier movable on said track and comprising sprocket-driven chains with bars connecting them at intervals and series of nipples on the bars for seating bottles in inverted position and having tubes extending from them to enter the bottle-necks, and means for driving the carrier intermittently.

3. In a bottle-washing machine, the combination of a tank forming a series of compartments and having a track extending lengthwise over it, sets of jetting-nozzles extending over the compartments below said track, means for supplying washing-water to said nozzles, an endless carrier movable on said track and comprising sprocket-driven chains with pairs of spaced bars connecting them at intervals and a series of devices secured between each pair of said bars for seating bottles in inverted position, each of said devices consisting of legs terminating in a nozzle having a tube extending therefrom to enter a bottle-neck, and means for driving the carrier.

4. In a bottle-washing machine, the combination of a tank having a track extending lengthwise over it, jetting-nozzles supported over the tank below the track, means for supplying washing-water to said nozzles, an endless carrier movable on said track and comprising sprocket-driven chains with bars connecting them at intervals and series of pockets on the bars for holding bottles in inverted position, comprising frames secured to said bars with rods rigidly connecting the frames of the pocket-series, and means for driving the carrier.

5. In a bottle-washing machine, the combination of a tank forming a series of compartments and having a track extending lengthwise over it, sets of jetting-nozzles extending over the compartments below said track, means for supplying washing-water to said nozzles, an endless carrier movable on said track and comprising sprocket-driven chains with bars connecting them at intervals and series of pockets on the bars for holding bottles in inverted position, comprising heads secured to the bars, with arms extending from each head, a frame about said arms and rods connecting the series of arms at their outer ends, and means for driving the carrier.

6. In a bottle-washing machine, the combination of a tank forming a series of compartments and having a track extending lengthwise over it, sets of jetting-nozzles extending over the compartments below said track, means for supplying washing-water to said nozzles, an endless carrier movable on said track and comprising sprocket-driven chains with bars connecting them at intervals and series of pockets on the bars for holding bottles in inverted position, comprising heads secured to the bars with arms extending from each head, rods connecting the series of arms at their outer ends and frames about the arms presenting by successive frames opposing concave sides to surround the bottles, and means for driving the carrier.

7. In a bottle-washing machine, the combination of a tank forming a series of compartments and having a track extending lengthwise over it, sets of jetting-nozzles extending over the compartments below said track, means for supplying washing-water to said nozzles, an endless carrier movable on said track and comprising sprocket-driven chains with bars connecting them at intervals and series of pockets on the bars for holding bottles in inverted position, comprising heads secured to the bars with arms extending from each head, rods connecting the series of arms at their outer ends and frames about the arms presenting, by successive frames, opposing concave sides to surround the bottles, with inclined faces to guide them into place, and means for driving the carrier.

8. In a bottle-washing machine, the combination of a tank having a track extending lengthwise over it, sets of jetting-nozzles supported over the tank below said track, means for supplying washing-water to said nozzles, an endless carrier movable on said track and comprising sprocket-driven chains with pairs of spaced bars connecting them at intervals, a series of pockets extending from between the members of each pair of bars for holding the bottles in inverted position, and series of nozzles supported between said members centrally of the pockets.

9. In a bottle-washing machine, the combination of a tank forming a series of compartments and having a track extending lengthwise over it, sets of jetting-nozzles extending over the compartments below said track, means for supplying washing-water to said nozzles, an endless carrier movable on said track and comprising sprocket-driven chains with pairs of spaced bars connecting them at intervals, a series of pockets extending from between the members of each pair of bars for holding the bottles in inverted position, and series of nozzles supported between said members centrally of the pockets with tubes extending from them to enter the bottle-necks, and means for driving the carrier.

10. In a bottle-washing machine, the combination of a tank forming a series of compartments and having a track extending lengthwise over it, sets of jetting-nozzles extending over the compartments below said track, means for supplying washing-water to said nozzles, an endless carrier movable on said track and comprising sprocket-driven chains with pairs of spaced bars connecting them at intervals, a series of pockets on each pair of bars for holding bottles in inverted position, comprising heads secured between the members thereof with a pair of arms extending from each head connected at their outer ends and there terminating in eyes, and a frame about each pair of arms, and means for driving the carrier.

11. In a bottle-washing machine, the combination of a tank having a track extending over it, jetting-nozzles supported to extend over the tank, means for supplying washing-water to said nozzles, an endless carrier provided with bottle-pockets to register with said nozzles, means for driving the carrier, a receptacle outside the tank and means for intercepting from entering the tank labels washed from the bottles.

12. In a bottle-washing machine, the combination of a tank having a track extending over it, jetting-nozzles supported to extend over the tank, means for supplying washing-water to said nozzles, an endless carrier provided with bottle-pockets to register with said nozzles, a receptacle outside the tank, a conveyer for automatically removing to said receptacle labels washed from the bottles, and means for driving the carrier and conveyer.

13. In a bottle-washing machine, the combination of a tank, series of jetting-nozzles supported to extend at predetermined distances apart over the tank, means for supplying washing-water to said nozzles, a carrier comprising a pair of parallel endless belts moving at the opposite ends of said nozzle-series and bottle-holders supported to extend between said belts to move over said nozzles and provided with tapering nozzles in their bases, and means for driving said belts intermittently to register in each interval between movements thereof said tapering nozzles with said jetting-nozzles.

14. In a bottle-washing machine, the combination of a tank forming a series of compartments and having a track extending lengthwise over it, sets of jetting-nozzles extending over the compartments below said track, means for supplying washing-water to said pipes, an endless carrier movable on said tracks and having pockets in sets to register in the travel of the carrier with said nozzles and adapted to hold in inverted position the bottles and automatically discharge them at the delivery-end of the carrier, a drip-catching receptacle at one end of the track below the load-receiving end of the carrier, means for driving the carrier intermittently, and a conveyer at the opposite end of the tank to receive the bottles as they discharge from said pockets.

15. In a bottle-washing machine, the combination of a tank forming a series of compartments, pumps having pipe-connections at their suction-sides with the compartments and delivery-pipes leading from their discharge-sides, manifolds on the upper ends of said delivery-pipes, sets of jet-pipes extending from the manifolds across the compartments, means for driving the pumps, an endless carrier supported to travel lengthwise over the tank above the jet-pipes and provided with pockets adapted to hold bottles in inverted position for automatic discharge at the delivery-end of the carrier, a vertically-adjustable hood extending over the tank, and means for driving the carrier intermittently.

16. In a bottle-washing machine, the combination of a tank forming series of compartments, pumps. having pipe-connections at their suction-sides with the compartments and delivery-pipes leading from their discharge-sides, manifolds on the upper ends of said delivery-pipes, sets of jet-pipes extending from the manifolds across the compartments, means for driving the pumps, posts rising at intervals on opposite sides of the tank, a track supported on the posts to extend lengthwise of the tank, an endless carrier supported to travel along the track and constructed to support bottles in inverted position, a hood having link-connections with the posts to support it adjustably over the carrier, handle-operated means for raising and lowering the hood and means for securing it in adjusted position, and intermittently-operating driving mechanism for the carrier.

17. In a bottle-washing machine, the combination of a tank forming a series of compartments, pumps having pipe-connections at their suction-sides with the compartments and delivery-pipes leading from their discharge-sides, manifolds on the upper ends of said delivery-pipes, sets of jet-pipes extending from the manifolds across the compartments, means for driving the pumps, an endless carrier supported to travel lengthwise of the tank and constructed to support bottles in inverted position, means for driving the carrier intermittently, a hood extending over the tank, a baffle-plate in a compartment at one side of its longitudinal center and extending short of the base and a similar baffle-plate extending from the base adjacent to the suction-discharge therefrom, and a shed inclining in the compartment over said baffle-plates.

18. In a bottle-washing machine, the combination of a tank forming a series of compartments, pumps having pipe-connections at their suction-sides with the compartments and delivery-pipes leading from their discharge-sides, means for driving the pumps, a track supported to extend lengthwise over the tank, an endless carrier traveling along the track and constructed to support bottles in inverted position, a hood extending over the carrier, pipe-sustaining frames on the track-support below the track thereon, manifolds on the upper ends of said delivery-pipes and formed of relatively adjustable sections, jet-pipes extending from said sections upon said supporting-frames, and means for driving the carrier intermittently.

19. In a bottle-washing machine, the combination of a tank forming a series of compartments, pumps having pipe-connections at their suction-sides with the compartments and delivery-pipes leading from their discharge-sides, means for driving the pumps, posts rising at intervals on opposite sides of the tank, a track on said posts, frames supported on the posts over the compartments below the track, an endless carrier having rollers traveling on said track and constructed to support bottles in inverted position, a hood supported on the posts to extend over said carrier lengthwise of the tank, manifolds on the upper ends of said delivery-pipes formed of couplings and right-and-left threaded unions, jet-pipes extending from the couplings upon said frames, and means for driving the carrier intermittently.

20. In a bottle-washing machine, the combination of a tank forming a series of compartments, pumps having pipe-connections at their suction-sides with the compartments and delivery-pipes leading from their discharge-sides, manifolds on the upper ends of said delivery-pipes, sets of jet-pipes extending from the manifolds across the compartments, the manifold at the discharge-end of the machine having an end-section closed to the delivery-pipe of said manifold and provided with a separate fresh-water supply-pipe, means for driving the pump, an endless carrier supported to travel lengthwise over the tank above the jet-pipes and constructed to carry bottles in inverted position, a hood extending over the carrier, and means for driving the carrier intermittently.

21. In a bottle-washing machine, the combination of a tank forming a series of compartments, pumps having pipe-connections at their suction-sides with the compartments and delivery-pipes leading from their discharge-sides, manifolds on the upper ends of said delivery-pipes, sets of jet-pipes extending from the manifolds across the compartments, means for driving the pumps, an endless carrier supported to travel lengthwise over the tank above the jet-pipes and constructed to carry bottles in inverted position, a hood extending over the carrier, means for driving the carrier intermittently, and an endless traveling apron extending across a compartment below the jet-pipes thereof.

22. In a bottle-washing machine, the combination of a tank forming a series of compartments, pumps having pipe-connections at their suction-sides with the compartments and delivery-pipes leading from their discharge-sides, manifolds on the upper ends of said delivery-pipes, sets of jet-pipes extending from the manifolds across the compartments, means for driving the pumps, an endless carrier supported to travel lengthwise over the tank above the jet-pipes and constructed to carry bottles in inverted position, a hood extending over the carrier, means for driving the carrier intermittently, a compartment-extension at one side of the tank, a receptacle supported in said extension, and an endless traveling apron extending below the jet-pipes across the compartment provided with the extension and discharging to said receptacle.

23. In a bottle-washing machine, the combination of a tank forming a series of compartments, a compartment in the series being provided with extension at one side of the tank, a receptacle supported in the extension, pumps having pipe-connections at their suction-sides with the compartments and delivery-pipes leading from their discharge-sides, manifolds on the upper ends of said delivery-pipes, sets of jet-pipes extending from the manifolds across the compartments, means for driving the pumps, an endless carrier supported to travel lengthwise over the tank above the jet-pipes and constructed to carry bottles in inverted position, a hood extending over the carrier, means for driving the carrier intermittently, an endless traveling apron extending across the extension-equipped compartments below the jet-pipes thereof and discharging to said receptacle, and spraying-pipes discharging through said aprons into the baskets.

JOHN T. H. PAUL.

In presence of—
L. HEISLAR,
R. SCHAEFER.